(12) United States Patent
Volpert

(10) Patent No.: US 9,599,219 B2
(45) Date of Patent: Mar. 21, 2017

(54) GEAR SHIFTING SYSTEM AND GEAR SHIFTING ELEMENT FOR A GEAR SHIFTING SYSTEM

(71) Applicant: ZF Friedrichshafen AG, Friedrichshafen (DE)

(72) Inventor: Bastian Volpert, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/443,763

(22) PCT Filed: Oct. 10, 2013

(86) PCT No.: PCT/EP2013/071181
§ 371 (c)(1),
(2) Date: May 19, 2015

(87) PCT Pub. No.: WO2014/075857
PCT Pub. Date: May 22, 2014

(65) Prior Publication Data
US 2015/0292618 A1    Oct. 15, 2015

(30) Foreign Application Priority Data

Nov. 19, 2012 (DE) .......................... 10 2012 221 062

(51) Int. Cl.
*B60K 20/00* (2006.01)
*F16H 63/04* (2006.01)
(Continued)

(52) U.S. Cl.
CPC ........... *F16H 63/04* (2013.01); *F16H 63/304* (2013.01); *F16H 63/3043* (2013.01);
(Continued)

(58) Field of Classification Search
CPC ..... B60K 17/344; F16H 63/04; F16H 63/304; F16H 63/3043; F16H 63/38; F16H 2063/3056; F16H 2063/3093
(Continued)

(56) References Cited

U.S. PATENT DOCUMENTS 8,919,515 B2 * 12/2014 Granzow ..................... 192/69.9
2001/0006921 A1 * 7/2001 Reik ..................... B60W 10/02
477/79

(Continued)

FOREIGN PATENT DOCUMENTS

WO    WO 2012/055386 A1    5/2012

OTHER PUBLICATIONS

PCT Search Report and Written Opinion, Apr. 10, 2014
German Patent Office Search Report, Sep. 6, 2013.

*Primary Examiner* — William Kelleher
*Assistant Examiner* — Zakaria Elahmadi
(74) *Attorney, Agent, or Firm* — Dority & Manning, P.A.

(57) ABSTRACT

A gear shifting device, having a first, rotatably drivable transmission component, on which a shift element is arranged in a torque-proof and axially displaceable manner, which is axially movable into at least one shift position, in which the first transmission component is coupled in a torque-proof manner with a transmission component that is arranged adjacent to it and is connectable thereon, whereas an axial shift movement of the shift element into the at least one shift position and/or from this through the interaction of one shift pin is able to be triggered with at least one associated groove-like shift gate, which is designed to be changeable in an axial direction, at least in sections. Thereby, the shift element features, on an inner diameter and/or an outer diameter, at least one associated shift gate, while the respective one shift pin is arranged in a radially displaceable manner, and the at least one shift gate is
(Continued)

arranged in a radially opposite manner, to the transmission component adjacent to the shift element, and/or that the shift element, on an inner diameter and/or an outer diameter, accommodates the respective one shift pin in a radially displaceable manner, whereas the at least one associated shift gate for the respective shift gate is arranged to be radially opposite to a transmission component located adjacent to the shift element, and that, in each case, a shift pin is movable through an associated actuator in a radial manner between an initial position and a mesh position, in which each shift pin is able to be introduced into the at least one associated shift gate.

10 Claims, 2 Drawing Sheets

(51) Int. Cl.
*F16H 63/30* (2006.01)
*F16H 63/38* (2006.01)

(52) U.S. Cl.
CPC ..... *F16H 63/38* (2013.01); *F16H 2063/3056* (2013.01); *F16H 2063/3093* (2013.01)

(58) Field of Classification Search
USPC ............... 74/473.36, 473.37, 473.24, 473.25
See application file for complete search history.

(56) References Cited

U.S. PATENT DOCUMENTS

| | | | |
|---|---|---|---|
| 2005/0155446 A1* | 7/2005 | Heathcote | F16H 63/20 74/473.25 |
| 2011/0100144 A1* | 5/2011 | Neelakantan | F16H 63/18 74/473.36 |
| 2012/0037472 A1* | 2/2012 | Rosemeier | F16H 61/32 192/66.1 |
| 2012/0096972 A1* | 4/2012 | Retsch | F16H 61/18 74/473.36 |
| 2012/0255382 A1* | 10/2012 | Richter | F16H 63/304 74/333 |
| 2014/0116180 A1* | 5/2014 | Keller | F16D 11/10 74/473.36 |
| 2015/0068344 A1* | 3/2015 | Ziemer | F16D 11/14 74/473.36 |
| 2015/0252898 A1* | 9/2015 | Wise, Jr. | F16H 63/38 74/473.25 |
| 2015/0260285 A1* | 9/2015 | Buender | F16H 63/30 74/473.12 |
| 2015/0285375 A1* | 10/2015 | Volpert | F16H 63/28 74/473.36 |
| 2015/0330506 A1* | 11/2015 | Volpert | F16H 63/18 74/473.36 |

* cited by examiner

GEAR SHIFTING SYSTEM AND GEAR SHIFTING ELEMENT FOR A GEAR SHIFTING SYSTEM

FIELD OF THE INVENTION

The invention relates to a gear shifting device having a first, rotatably drivable transmission component on which a shift element is arranged in a torque-proof and axially displaceable manner. The shift element is axially movable into at least one shift position in which the first transmission component is coupled in a torque-proof manner with a transmission component that is arranged adjacent to it and is connectable thereon. An axial shift movement of the shift element into the shift position is from the interaction of a shift pin with at least one associated groove-like shift gate, which is designed to be changeable in an axial direction. The invention also relates to a shift element for a gear shifting device.

BACKGROUND

With stage transmissions, gear shifting devices are used in order to couple transmission components of the respective transmission with each other in a torque-proof manner for the presentation of each corresponding transmission ratio relationship. Thereby, usually one shift element is assigned to a gear shifting device, which, depending on the specific arrangement, makes a force-fitting or positive-locking coupling of the respective assigned transmission components upon actuation. Thereby, the respective shift element is typically provided in a torque-proof and axially displaceable manner on one of the two transmission components to be connected in a torque-proof manner, and is displaced into a respective shift position by means of an actuator, in which the desired, torque-proof coupling is realized under the prior reduction of any possible prevailing difference in rotational speed between the two transmission components. Depending on the specific arrangement of such actuator system, such an axial shift movement of the respective shift element is thereby initiated mechanically, hydraulically, pneumatically, electrically or through mixed forms.

A gear shifting device of an automated gearbox arises from DE 196 27 980 A1, through which a first rotatably drivable transmission component can be coupled, in the form of a transmission shaft, with several transmission components that are adjacently located. In the cited case, such additional transmission components comprise gear wheels that are rotatably mounted on it. In addition, several shift elements in the form of clutch sleeves are arranged on the transmission shaft in a torque-proof and axially displaceable manner, whereas each of the clutch sleeves is composed of a ring-shaped body, which is provided on an inner circumference with an axially running toothing and is guided through such toothing to a corresponding toothing on the sides of the radial inner transmission shaft.

Each of the sliding sleeves may now, in each case, move axially between a neutral position, in which the respective sliding sleeve does not couple any of the two gear wheels, located axially on both sides, with the transmission shaft, and two shift positions in which, in each case, the transmission shaft is coupled in a torque-proof manner with one gear wheel under the prior reduction of a difference in rotational speed. Thereby, in the present case, the axial shift movements of the individual sliding sleeves are presented through an electric motor, intermediate transmission ratio stages and one shift drum in the interaction with a shift fork assigned to the individual clutch sleeves. Thereby, through the electric motor, by means of the intermediate transmission ratio stages, this brings about, on the one hand, an opening of the separating clutch upstream of the transmission shaft and, on the other hand, a corresponding turning of the shift drum at the same time.

The shift drum is provided on a radial outer side with groove-like shift gates, which are designed to be changeable in an axial direction, at least in sections, and in which one shift pin of the respective shift fork runs. If the shift drum is set in rotational motion through the electric motor by means of intermediate transmission ratio stages, the course changeable in an axial direction of the respective shift gate, through the shift pin running thereon, brings about an axial sliding movement of the respective shift fork, which is translated into a corresponding axial displacement of each corresponding clutch sleeve on the transmission shaft. As a result, the respective clutch sleeve is moved axially between its respective neutral position and one of the possible shift positions. Thereby, the shift gates on the shift drum are designed to have a course that is changeable in an axial direction in such a manner that, upon a constant rotational motion initiated by the electric motor, a sequential shifting of the individual gears of the automated gearbox takes place with the respective open separating clutch.

SUMMARY OF THE INVENTION

Based on the state of the art described above, it is a task of the present invention to make available a gear shifting device, through which at least one shift movement of a shift element for the torque-proof coupling and/or separation of the two transmission components that are otherwise able to be turned relative to each other can be realized with a compact structure. Additional objects and advantages of the invention will be set forth in part in the following description, or may be obvious from the description, or may be learned through practice of the invention.

The tasks are solved on the basis of the invention as described and claimed herein.

In accordance with the invention, a gear shifting device comprises a first, rotatably drivable transmission component on which a shift element is arranged in a torque-proof and axially displaceable manner. The shift element can be axially moved into at least one shift position wherein the first transmission component is thereby coupled in a torque-proof manner with a transmission component that is connectable thereon, and which is arranged adjacent to the first transmission component and is otherwise able to be turned relative to it. In addition, an axial shift movement of the shift element into the at least one shift position and/or from this through the interaction of a shift pin is able to be triggered with at least one associated groove-like shift gate, which is designed to be changeable in its course in an axial direction, at least in sections.

Within the meaning of the invention, a "transmission component" is generally understood to mean a rotatable or stationary component of the transmission, such as a transmission shaft, a gear wheel, a housing or a housing part, etc. In particular, at least upon the shifting of individual gears of the transmission, the respective transmission component is involved in the power transmission between an input side and an output side of the transmission. While the first transmission must necessarily concern a rotatably drivable transmission component, such as a transmission shaft or a gear wheel of a transmission ratio stage in accordance with the invention, the transmission that is located adjacent to it and is connectable thereon may likewise either be designed as a rotatably drivable transmission component, thus for example as a transmission shaft, or present as a rotatably mounted spur gear, or even as a stationary component in the form of a transmission housing or a part of a transmission housing. In the case of the first variant, the two transmission components then rotate together after the torque-proof coupling, while, in the latter case, the first transmission component is, with a torque-proof connection, fixed to it with a connectable transmission component.

Within the meaning of the invention, the shift element may be directly involved in the torque-proof connection of the first transmission component to the connectable transmission component, by, with its axial displacement in the respective shift position, it being in contact with the connectable transmission component itself, thus itself transferring a torque from the first transmission component to the connectable transmission component. Thereby, the connectable transmission component for the torque-proof coupling can be provided with an additional component, for example in the form of a coupling body, with which the shift element of the first transmission component is, upon its transfer, in torque-proof contact in the shift position. As an alternative to this, however, the additional connectable transmission component is provided with its own shift element, which is likewise provided in a torque-proof and axially displaceable manner on the sides of the connectable transmission component and is to be moved for the torque-proof coupling of the transmission components at the same time with the shift element provided on the sides of the first transmission component in an associated shift position, in which it is then coupled to the first transmission component in a torque-proof manner.

However, as an alternative to the options specified above, the shift element may concern a component that does not directly carry out the coupling of the two transmission components, but only initiates this torque-proof coupling, without thereby itself transferring a torque. Thus, a design of the shift element as sliding piston is conceivable, which, upon a transfer into a shift position, additional components connected to the transmission components to be coupled, such as two multi-disk sets of a multi-disk pack, press together, and this brings about the coupling of the transmission components.

Finally, the gear shifting device in accordance with the invention may either be designed as a simple shifting device, with which the associated shift element is able to move from a neutral position only into a shift position, or realized as a dual shifting device, with which the associated shift element may be axially displaced from the neutral position, both in a first direction and in a second direction, into a shift position, and thereby makes a torque-proof connection of the first transmission component with a connectable transmission component that is located adjacent to it. Furthermore, within the framework of the invention, an arrangement is also conceivable, with which there can only be a change between two shift positions; thus, a neutral position of the shift element is not possible.

In accordance with the invention, a shift element of a gear shifting device particularly features a ring-shaped body, which is provided on an inner circumference with an axially running toothing, through which the body can be guided, in a torque-proof and axially displaceable manner, through a corresponding toothing to a radial inner transmission component. It is particularly preferable that the ring-shaped body forms a circular ring and is formed by an individual element, whereas, in principle, within the framework of the invention, an assembly of the body from several individual parts is conceivable. Such individual parts are then connected to each other at least in a torque-proof manner.

In principle, the shift element in accordance with the invention may also be arranged in such a manner that, in a gear shifting device, upon an axial displacement into the shift position, a positive-locking or force-fitting coupling of the two transmission components is brought about. Such shift element may be designed as a claw sleeve of a claw clutch or claw brake, as a sliding sleeve of a block synchronization, or a similarly structured component, which, after a reduction of any possible difference in rotational speed between the two transmission components, makes the positive-locking coupling. Thereby, a reduction of the difference in rotational speed is either accomplished purely through a tooth meshing of the shift element with an element provided on the sides of the additional transmission component or brought about with the assistance of intermediate components, such as synchronizer rings. In addition, the shift element may also comprise a sliding piston that, when it is displaced, presses together the clutch halves of a force-fitting clutch or brake, such as a multi-disk clutch or brake.

The invention includes the technical teaching that the shift element features, on an inner diameter and/or an outer diameter, at least one associated shift gate, while the respective shift pin is arranged in a radially displaceable manner, and the shift gate is arranged in a radially opposite manner, on the transmission component adjacent to the shift element. As an alternative or in addition to this, the shift element, on a radial inner diameter and/or a radial outer diameter, accommodates the respective shift pin in a radially displaceable manner, whereas the associated shift gate for the respective shift gate is arranged to be radially opposite to a transmission component located adjacent to the shift element. In addition, the respective shift pin may be moved through an associated actuator, in each case radially between an initial position and a mesh position, in which it can be introduced into the at least one associated shift gate.

In other words, in each case, the shift pin and the associated groove-like shift gate are provided radially opposite between the shift element and a transmission component located adjacent to it. On the one hand, one of these two components, thus either the shift pin or the shift gate, is thereby provided on an inner diameter or an outer diameter of the shift element, whereas the other element is, conversely to this, placed on a radial outer side or a radial inner side of the adjacent transmission component. If various axial shift movements of the shift element are initiated by such an interaction, depending on the shift pin, with at least one associated shift gate, on the sides of the shift element and one or various radially adjacent transmission components, several pairs of one shift pin and one shift gate can be provided. If there are several such pairs, different combinations are conceivable, with which the shift element, on its inner diameter and/or also on its outer diameter, accommodates several shifting pens, several shift gates, or at least one shift pin and at least one shift gate. Thereby, in each case, the elements thereby opposite to these can only be provided on only one adjacent transmission component or on different adjacent transmission components, but necessarily must be arranged to be radially opposite.

The associated axial shift movement is triggered by the fact that the respective shift pin radially movable through the associated actuator is introduced into the associated shift gate such that, in accordance with the course of the shift gate changeable in an axial direction, an axial displacement of the shift element relative to the transmission component that is adjacently located is brought about. Since this axial shift movement takes place initially upon the radial displacement of the respective shift pin from the initial position into the mesh position, this axial shift movement of the shift element can be introduced through the actuator in a targeted manner. At the same time, the arrangement of the shift pin with the actuator and the provision of the shift gate in compact form is possible. Preferably, the actuator thereby comprises an electrical actuator, such that, compared to a mechanical or a hydraulic actuator system, the control of the shift element is possible with low weight and a low need for installation space. As a whole, the gear shifting device in accordance with the invention can be realized in the area of a transmission in a manner that saves space, whereas it is also the case that several shift elements can be controlled easily and independent of each other through a gear shifting device that is so designed.

In contrast to this, with DE 196 27 980 A1, the shift pins provided on the sides of the shift forks run permanently in the associated shift gates, which are arranged to be on the radial outer side of the shift drum. As a result, the individual shift element may not be individually displaced from a neutral position into a shift position, since axial shift movements of the shift elements are always rigidly carried out according to the turning of the shift drum and the respective design of the shift gates. Thus, the shifting of the gears of the automatic vehicle transmission of DE 196 27 980 A1 is effected in accordance with a rigidly predetermined shifting sequence, such that, for example, a skipping of one or more gears is not possible. Thus, this structure is suitable only for use with an automated transmission. In addition, the housing of the actuator system composed of an electric motor, transmission ratio stages, and a shift drum requires a corresponding installation space, such that, in the case of DE 196 27 980 A1, a compact actuation of the shift elements is not possible.

In the present case, it is clear to the specialist that, with the gear shifting device in accordance with the invention, for the initiation of an axial movement of the shift element up to its transfer into the at least one shift position, a relative rotational speed between the component bearing the shift pin and the component provided with the groove-like shift gate is always required, since, otherwise, the enclosing of the shift pin in the associated shift gate is not translated into an axial sliding movement. This has the consequence that, when the first transmission component is at rest, a shift movement of the shift element cannot be carried out to the extent that the opposing transmission component, which features either the respective shift pin or the associated shift gate, performs a rotational motion. Furthermore, a gear shifting device in accordance with the invention is to be provided at least with start-up gears on the input side, since, at the beginning of a start-up procedure of the motor vehicle, the output side of the respective motor vehicle transmission is at a standstill. Generally, however a gear shifting device in accordance with the invention can easily be used with all stage transmissions and thereby in particular with motor vehicle transmissions.

According to one embodiment of the invention, the respective shift pin and the actuator are arranged at a housing provided in a manner that radially surrounds the shift element. The provision of the shift pin(s), along with the several actuators on the sides of the housing, thereby has the advantage that such components are thus provided on the sides of a stationary part, and thus the feed of control lines to the associated actuator may be simply arranged. Thus, in the case of the arrangement of the actuator as an electronic actuator, electric wires may be easily led into the area of the actuator. In addition, the arrangement of the respective shift pin on the sides of the housing results in the fact that, upon the rotation of the first transmission component, there is always a relative rotational speed between the respective shift pin and the shift gate provided on the sides of the shift element. Apart from this, however, the respective shift pin and the associated actuator may also be provided on the sides of the rotatable shift element or on a rotatable transmission component, whereas control and supply lines of the actuator are then to lead to the respective rotating component.

According to an additional arrangement of the invention, which is an alternative or a supplement to the aforementioned embodiment, the shift element is provided on its axial front side, radially on the outside, with a revolving toothing. In addition, in an axial manner between itself and the shift element, the connectable transmission component guides one coupling body that is ring-shaped and is connected in a torque-proof manner to the connectable transmission component, which coupling body is provided with a toothing on an inner circumference and at a front side axially turned towards the shift element, which is formed in a manner corresponding to the toothing provided on the shift element. In accordance with the invention, in this case, the body of the shift element is provided with a toothing designed in the manner of an outer claw toothing, through which the shift element is, upon its displacement into its shift position, brought into tooth meshing with the toothing of the coupling body. The coupling body is in turn connected in a torque-proof and radially displaceable manner to the transmission component connectable to the first transmission component. As a result, through the shift element designed in such a manner and the coupling body, a positive-locking connection of the two transmission components can be presented.

In an additional form of the preceding variant, the coupling body may move in a radially relative manner at the connectable transmission component through an intermediate spring unit, which thereby preloads in a radial manner the coupling body in respect to the connectable transmission component. Thereby, such an arrangement of a gear shifting device has the advantage that any shock that arises upon the tooth meshing of the shift element with the coupling body is not transferred to the connectable transmission component, but is compensated through the intermediate spring unit. Preferably, the coupling body is thereby composed of several segments, in order to enable at least a low radial movability. Each of these segments is then coupled with the connectable transmission component in a torque-proof and radially movable manner. However, within the meaning of the invention, the coupling body may also be rigidly connected to the connectable transmission component or also designed in one piece with this, but whereas, in such case, no shock compensation is realized.

According to an additional embodiment of the invention, the shift element on the outer diameter is provided with an individual groove-like shift gate, which, upon the enclosing of an individual shift pin in interaction with this, causes a transfer of the shift element into a shift position in which the toothing of the shift element meshes with the toothing of the coupling body. In an axial manner between the connectable transmission component and the shift element, a spring element is thereby provided, which preloads the shift element in the shift position in the direction of a neutral position. Preferably, the shift gate of the shift element is designed in such a manner that the shift gate in the outer diameter of the body of the shift element passes through a transition area, to which a spiral-shaped section that is oriented in an axial direction appends, which in turn passes, at an end turned away from the transition area, into a section running on a constant axial level in a circumferential direction.

Thereby, such arrangement of a gear shifting device has the advantage that a displacement of the shift element between a shift position and a neutral position may be controlled solely through a shift pin with an assigned shift gate. Thus, upon movement of the shift pin in the shift gate, the displacement of the shift element into the shift position is brought about, whereas, through the interaction of the shift element with the section of the shift gate running at an axial level, the shift element remains in this position as long as the shift element is enclosed in the shift gate. On the other hand, if the shift pin is transferred back into its initial position and thereby moves out from the shift gate, the spring element between the connectable transmission device and the shift element causes a return displacement of the shift element to its neutral position. The opening of the positive-locking coupling defined through the two toothings at the shift element and the coupling body is automatically initiated by the spring element upon the moving back of the shift pin into its initial position. Preferably, the spring element is thereby designed as a disk spring, by which an arrangement of the spring element that is highly compact in axial terms is possible.

In an additional form of the aforementioned embodiments, the connectable transmission component is a housing on which the first transmission component is fixed in a positive-locking manner in the at least one shift position of the shift element. In this specific case, the positive-locking coupling acts as a positive-locking brake, through which the first transmission component may be stopped on the housing. In particular, the housing thereby has a radially projecting part, that interacts with the spring element to preload the shift element into its neutral position.

According to an additional arrangement of the invention, the first transmission component is a transmission shaft. Therefore, through the gear shifting device in accordance with the invention, this transmission shaft may be coupled in a torque-proof manner with the adjacent component, which comprises the housing of the transmission.

The invention is not limited to the specified combination of characteristics of the equivalent claims or any of the claims dependent on them. There are also options for combining individual characteristics with one another, and as they arise from the claims, the following description of one embodiment of the invention or directly from the figures. Any reference of the claims to the drawings through the use of reference signs should not restrict the scope of protection of the claims.

BRIEF DESCRIPTION OF THE DRAWINGS

Additional measures that improve the invention are shown in more detail below, together with the description of a preferred embodiment of the invention, which makes reference to the drawings shown in the figures. The following is shown.

DETAILED DESCRIPTION

Figure 1A:
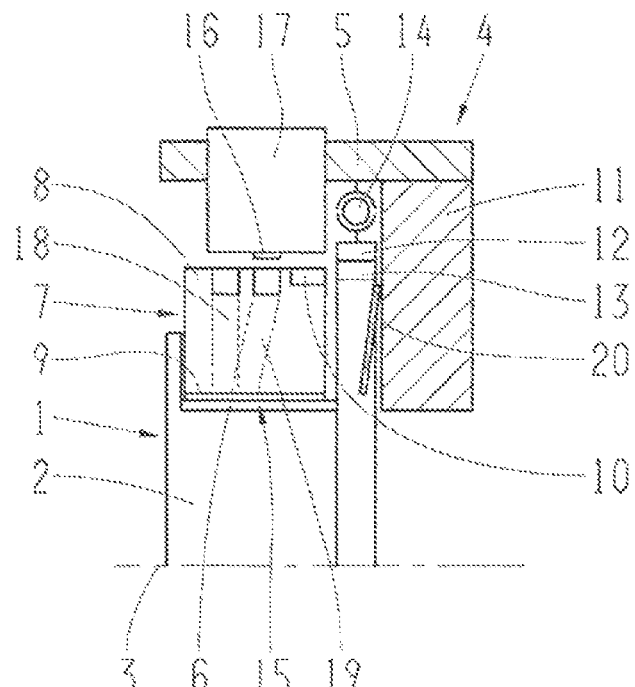
FIGS. 1A to 1D are schematic views of a gear shifting device according to a preferred embodiment of the invention, shown in different shifting states of the gear shifting device.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Each of FIGS. 1A to 1D shows a schematic view of a gear shifting device in accordance with a preferred embodiment of the invention, whereas, through FIGS. 1A to 1D, individual shifting states of this gear shifting device are thereby presented. In the following, the structure of the gear shifting device is to be initially described on the basis of FIG. 1A:

The gear shifting device shown in FIG. 1A comprises a shifting device of a stage transmission, in particular in the form of an automated car transmission. Thereby, this gear shifting device comprises a first transmission component 1, which in the present case is designed as a transmission shaft 2 of the transmission and can be set in rotation around the axis of rotation 3. Furthermore, an additional transmission component 4 in the form of a housing 5 of the transmission is provided in a manner that surrounds the transmission shaft 2. By means of the transmission in accordance with the invention, the transmission shaft 2 may thereby be coupled in a torque-proof manner with the housing 5, and thus may be stopped on this.

As can also be see in from FIG. 1A, the transmission shaft 2 features, on an outer diameter, a synchronization toothing 6, through which the transmission shaft 2 guides a shift element 7 set radially on the outside of the transmission shaft 2 in a torque-proof and axially displaceable manner. Thereby, such shift element 7 is designed with a ring-shaped body 8, which in the present case is formed in one piece and, on an inner circumference, is provided with a toothing 9 corresponding to the synchronization toothing 6. If there is a simultaneous axial displacement capability, the torque-proof arrangement of the shift element 7 on the transmission shaft 2 is thereby realized by the course of the teeth of the synchronization toothing 6 and the toothing 9 that is oriented in an axial direction.

The body 8 of the shift element 7 is also provided with a toothing 10 on an axial front side, which is provided in the manner of an outer claw toothing on a radial outer side of the body 8. In addition, in an axial manner between the shift element 7 and a section 11 of the housing 5 that projects radially inwards, a coupling body 12 is placed, which, on a radial outer side, is connected in a torque-proof manner to the housing 5, and, on a radial inner side, is equipped with a toothing 13. Thereby, this toothing 13 is formed in a manner corresponding to the toothing 10, and, upon the displacement of the shift element 7 into a shift position, is meshes with the toothing 10.

In addition, a spring unit 14 is placed in a manner radially between the coupling body 12 and the housing 5, which connects the coupling body 12 to the housing 5 in a torque-proof manner, but at the same time allows for radial relative movements of the coupling body 12 and preloads the coupling body 12 in a manner radially inwards with respect to the housing 5. Thereby, if there are prevailing relative rotational speeds between the transmission shaft 2 and the housing 5, and thus also between the shift element 7 and the housing 5, there can be a compensation for a shock that arises upon the beginning of the tooth meshing of the toothing 10 with the toothing 13, without this leading to a direct introduction into the housing 5. In order to thereby enable a certain radial movability of the coupling body 12, this is designed in ring shape and is composed of several segments that are connected to the surrounding housing 5 in a torque-proof and radially movable manner.

For the targeted axial displacement of the shift element 7 from the neutral position shown in FIG. 1A into a shift position, in which the toothing 10 of the shift element 7 meshes with the toothing 13 of the coupling body 12, the shift element 7 is provided with an individual shift gate 15 on the outer diameter of its body 8, through which by interaction with an associated shift pin 16, the axial displacement of the shift element 7 may be initiated in a targeted manner. Thereby, the shift pin 16 is provided together with an associated actuator 17 on the sides of the housing 5, whereas the shift pin 16 may be displaced through an actuator 17 from an initial position shown in FIG. 1A into a mesh position, in which it may be radially enclosed in the shift gate 15. For this purpose, the shift pin 16 is guided in the actuator 17 in a radially displaceable manner, which is thereby designed as an electric actuator and may, in a targeted manner, initiate the desired radial movement of the shift pin 17 through a corresponding power supply.

As can also be seen in FIG. 1A, the shift gate 15 is composed of a section 18 running in a constant axial level and a section 19 designed to be changeable in an axial direction, which thereby features a spiral-shaped character. In addition, the shift gate 15 is equipped with a transition area (which is not shown in the present case), through which the outer diameter of the ring-shaped body 8 passes in the changeable section 19 of the groove-like shift gate 15. In the neutral position of the shift element 7, the transition area of the shift gate 15 is axially at the level of the shift pin 16.

In addition, in a manner axially between the shift element 7 and the section 11 of the housing 5 and radially within the coupling body 12, a spring element 20 is provided in the form of a disk spring, which abuts on an outer radial end on the section 11 and comes into contact with an inner radial end with the shift element 7 in its shift position. Thereby, the spring element 20 is compressed in the shift position of the shift element 7, and thereby preloads the shift element 7 in the direction of its neutral position.

Figure 1B:
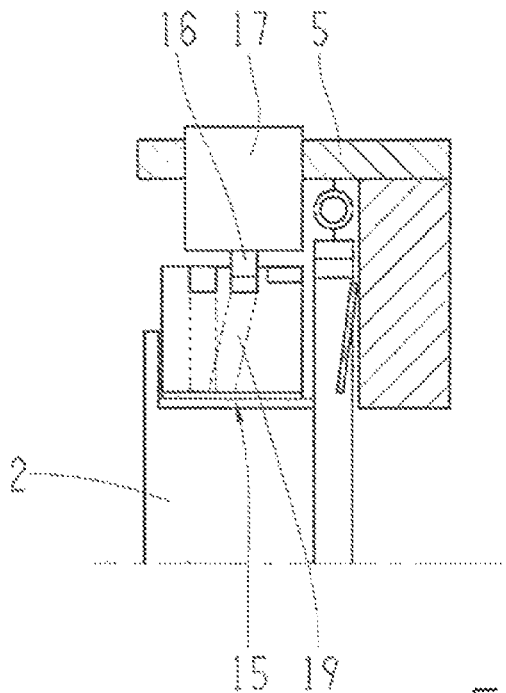

In the following, with reference to FIGS. 1A to 1D, a shift movement of the shift element 7 from the neutral position to be seen in FIG. 1A into the shift position and back into the neutral position is now to be described:

In order to initially move the shift element 7 from the neutral position shown in FIG. 1A into the shift position, in which the toothing 10 of the shift element 7 meshes with the toothing 13 of the coupling body 12 and thus forms a positive-locking connection between the transmission shaft 2 and the housing 5, initially in a first step, the shift pin 16 moves by means of the actuator 17 radially from the initial position shown in FIG. 1A into a mesh position emerging from FIG. 1B, in which the shift pin 16 is enclosed in the shift gate 15. If the shift gate 15 and the shift pin 16 in a circumferential direction do not overlap when actuating the shift pin 16, the shift pin 16 initially makes contact on the outer diameter of the shift element 7 until ultimately it can be slid into the shift gate is through the transition area of the shift gate 15. Subsequently, the section 19 of the shift gate 15 changeable in an axial direction brings about the fact that, based on the fixed position of the shift pin 16, an axial displacement of the shift element 7 is forced.

Subsequently, the shift element 7 is displaced from the axial position shown in FIG. 1B into the position shown in FIG. 1C, which corresponds to the shift position of the shift element 7. Along this path, in this shift position, the toothing 10 of the shift element 7 thereby meshes with the correspondingly arranged toothing 13 of the coupling body 12, whereas any shock that might arise based on the prevailing relative rotational speed between the transmission shaft 2 and the housing 5 is compensated by the spring unit 14, which allows for a radial compensatory movement of the coupling body 12 in respect of the housing 5. In addition, the shift element 7 comes into contact with the spring element 20 and tensions the same, as can be seen in FIG. 1C.

Figure 1C:
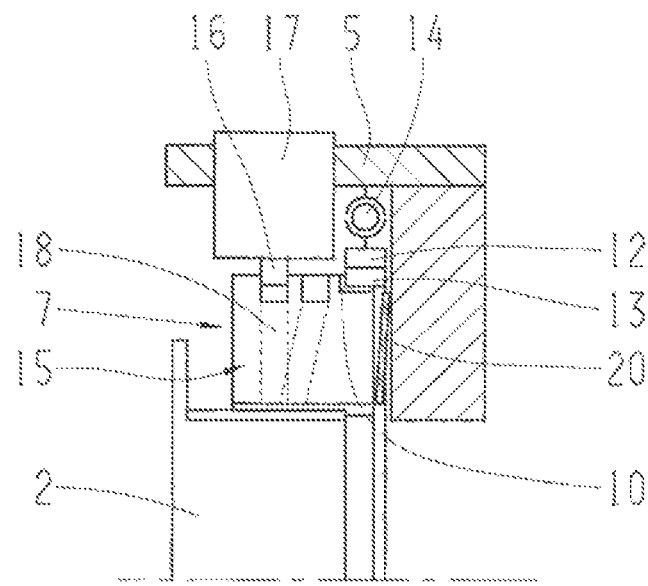

In FIG. 1C, the shift element 7 is then fully displaced into its shift position, such that the tooth meshing between the toothings 10 and 13 is carried out, and thus the shift element 7 and the coupling body 12, and the transmission shaft 2 and the housing 5, are coupled with each other in a torque-proof manner. Along this path, in the shift position, the transmission shaft 2 was fully braked by the tooth meshing and fixed on the housing 5. The shift pin 16 still held in the mesh position by the actuator 17 is thereby in the section 18 of the shift gate 15 running at an axial level, such that the shift pin 16 holds the shift element 7, which is stopped together with the transmission shaft 2, in the shift position counter to the spring element 20, and the toothings 10 and 13 remain in mesh.

Figure 1D:
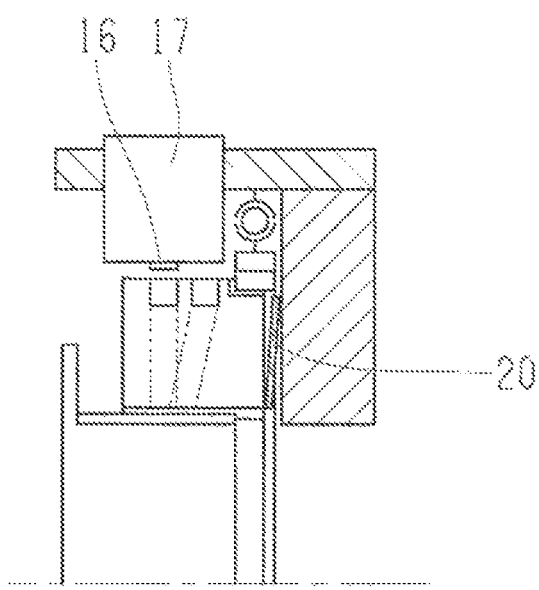

For the return movement of the shift element 7 into its neutral position, upon a step following this, as shown in FIG. 1D, the shift pin 16 moves back through the actuator 17 into its initial position. As a result, the spring element 20 may remain at rest, and the shift element 7 may slide back into the neutral position to be seen in FIG. 1A. Thus, the transmission shaft 2 may once again rotate relative to the housing 5.

By means of the arrangement of a gear shifting device in accordance with the invention, shift movements of a shift element 7 may be controlled in a compact manner, and accurately and independently.

Modifications and variations can be made to the embodiments illustrated or described herein without departing from the scope and spirit of the invention as set forth in the appended claims.

The invention claimed is:
1. A gear shifting device, comprising:
a first rotatably drivable transmission component (1);
a shift element (7) arranged in a torque-proof and axially displaceable manner on the first transmission component, the shift element axially movable into a shift position in which the first transmission component (1) is coupled in a torque-proof manner with a connectable transmission component (4) that is arranged adjacent and connectable to the first transmission component;
a groove-like shift gate (15) defined on an inner or outer diameter of the shift element (7), the shift gate having an axially changing course and located radially opposite to the connectable transmission component; and
a radially displaceable shift pin (16) arranged on the connectable transmission component radially opposite to the shift gate, the shift pin displaced by an associated actuator (17) in a radial manner between an initial position and a mesh position in which the shift pin is introduced into the shift gate;
wherein the shift element (7) is provided with a radial toothing (10) at an axial front side threrof, and further comprising a coupling body (12) located axially between the shift element and a radially projecting section of the connectable transmission component (4), the coupling body comprising a toothing (13) that engages with the toothing (10) on the shift element.

2. The gear shifting device according to claim 1, wherein the shift pin (16) and the associated actuator (17) are arranged on a housing (5) that radially surrounds the shift element (7).

3. The gear shifting device according to claim 1, wherein the coupling body (12) is ring-shaped and the toothing (13) is defined on an inner circumference of the ring-shaped coupling body at a side facing the shift element.

4. The gear shifting device according to claim 3, wherein the coupling body (12) is radially movable relative to the connectable transmission component (4) through an intermediate spring unit (14), the spring unit radially preloading the coupling body (12) relative to the connectable transmission component (4).

5. The gear shifting device according to claim 3, wherein the shift gate (15) is provided on an outer diameter of the shift element (7), wherein engagement of the shift pin in the shift gate causes an axial transfer of the shift element (7) into the shift position in which the toothing (10) of the shift element (7) meshes with the toothing (13) of the coupling body (12), and further comprising a spring element (20) axially between the connectable transmission component (4) and the shift element (7) that preloads the shift element (7) in the shift position towards a neutral position.

6. The gear shifting device according to claim 5, wherein the connectable transmission component (4) is a housing (5) on which the first transmission component (1) is fixed in a positive-locking manner in the shift position of the shift element.

7. The gear shifting device according to claim 1, wherein the first transmission component (1) is a transmission shaft (2).

8. A shift element (7) for a gear shifting device according to claim 1, comprising:
   a ring-shaped body (8) provided on an inner circumference thereof with an axially running toothing (9) by which the body (8) is guided in a torque-proof and axially displaceable manner by engagement with corresponding toothing of a radial inner transmission component (1);
   at least one groove-like shift gate (15) having an axially changing course on an inner diameter or outer diameter of the body; and
   wherein an assigned shift pin (16) provided on an additional adjacent transmission component is radially displaceable into the shift gate to axially shift the shift element.

9. The shift element (7) according to claim 8, wherein the body (8) further comprises a radial toothing (10) provided at an axial front side thereof.

10. The shift element (7) according to claim 8, wherein the shift gate (15) is in an outer diameter of the body (8) and comprises a spiral-shaped section (19) having a transition area with the outer diameter at one end thereof and at an opposite end appends into a section (18) running at a constant axial level in a circumferential direction.

* * * * *